United States Patent [19]

Tague et al.

[11] 4,447,870

[45] May 8, 1984

[54] APPARATUS FOR SETTING THE BASIC CLOCK TIMING IN A DATA PROCESSING SYSTEM

[75] Inventors: Steven A. Tague, Billerica; Virendra S. Negi, Pepperell, both of Mass.

[73] Assignee: Honeywell Information Systems Inc., Waltham, Mass.

[21] Appl. No.: 250,823

[22] Filed: Apr. 3, 1981

[51] Int. Cl.³ .............................................. G06F 1/04
[52] U.S. Cl. ..................................... 364/200; 364/900; 364/569
[58] Field of Search ............... 364/200, 900, 569, 705; 331/57, 135; 307/455, 221; 328/66, 62

[56] References Cited

U.S. PATENT DOCUMENTS

| | | | |
|---|---|---|---|
| 3,312,951 | 4/1967 | Hertz | 364/200 |
| 3,566,368 | 2/1971 | Blauw | 364/200 |
| 4,021,784 | 5/1977 | Kimlinger | 364/200 |
| 4,191,998 | 3/1980 | Carmody | 364/200 |
| 4,209,833 | 6/1980 | Krupp et al. | 364/569 |
| 4,245,323 | 1/1981 | Yamazaki et al. | 364/705 |
| 4,330,840 | 5/1982 | Kobayashi | 364/705 |
| 4,344,133 | 8/1982 | Bruce et al. | 364/200 |
| 4,348,743 | 9/1982 | Dozier | 364/900 |

Primary Examiner—Jerry Smith
Assistant Examiner—Jameson Lee
Attorney, Agent, or Firm—George Grayson; Nicholas Prasinos

[57] ABSTRACT

A microprogrammed commercial instruction processor in a data processing system includes a bank of switches coupled to a multitapped delay line for selecting delay line signals for setting the basic clock timing. Another of the switches when activated conditions the commercial instruction processor so that when it is reset a special clock setting firmware loop is entered. The loop provides an uninterrupted succession of clock pulses which allows one to adjust the basic clock timing within specification.

4 Claims, 4 Drawing Figures

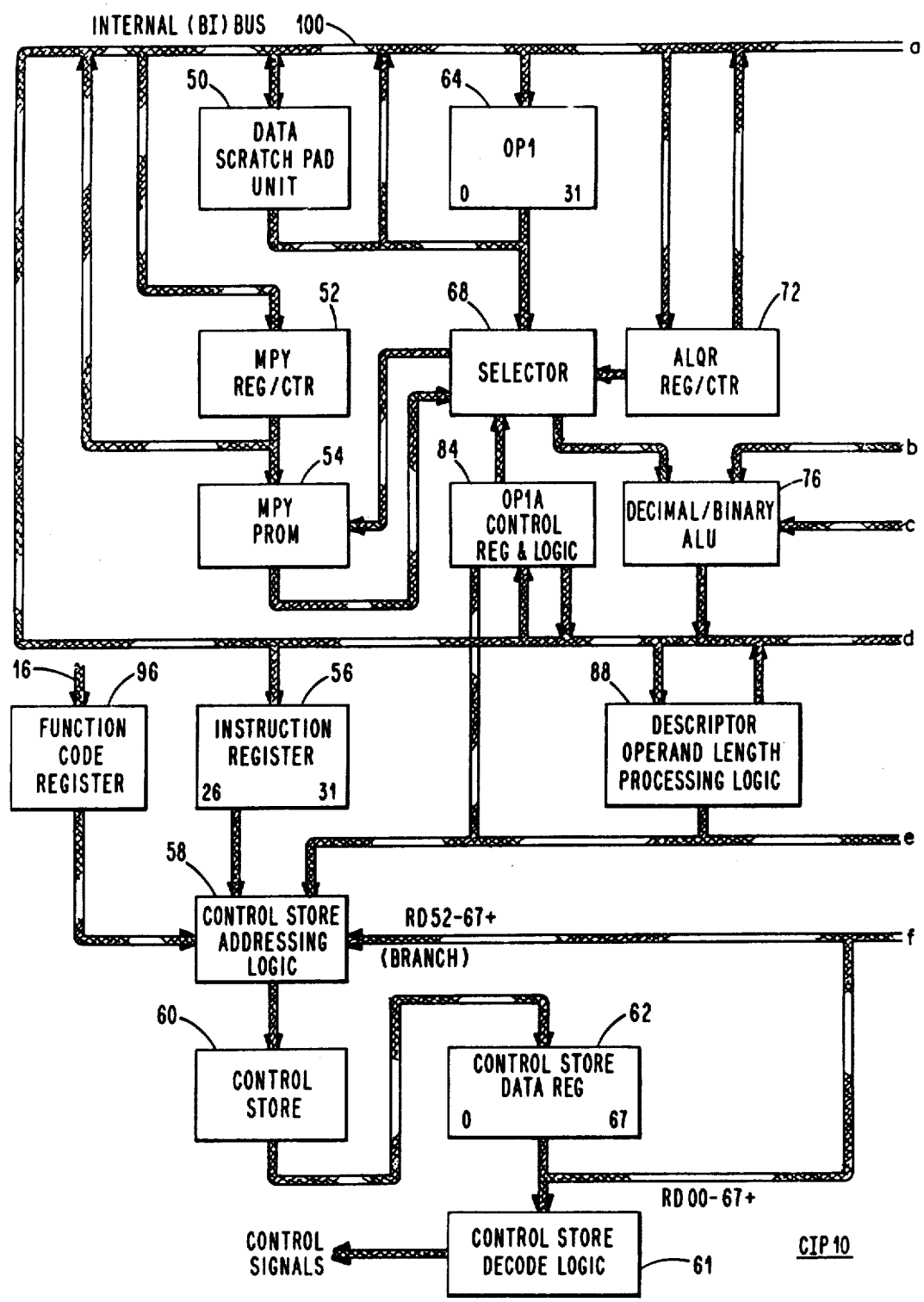
Fig. 2. (sheet 1 of 2)

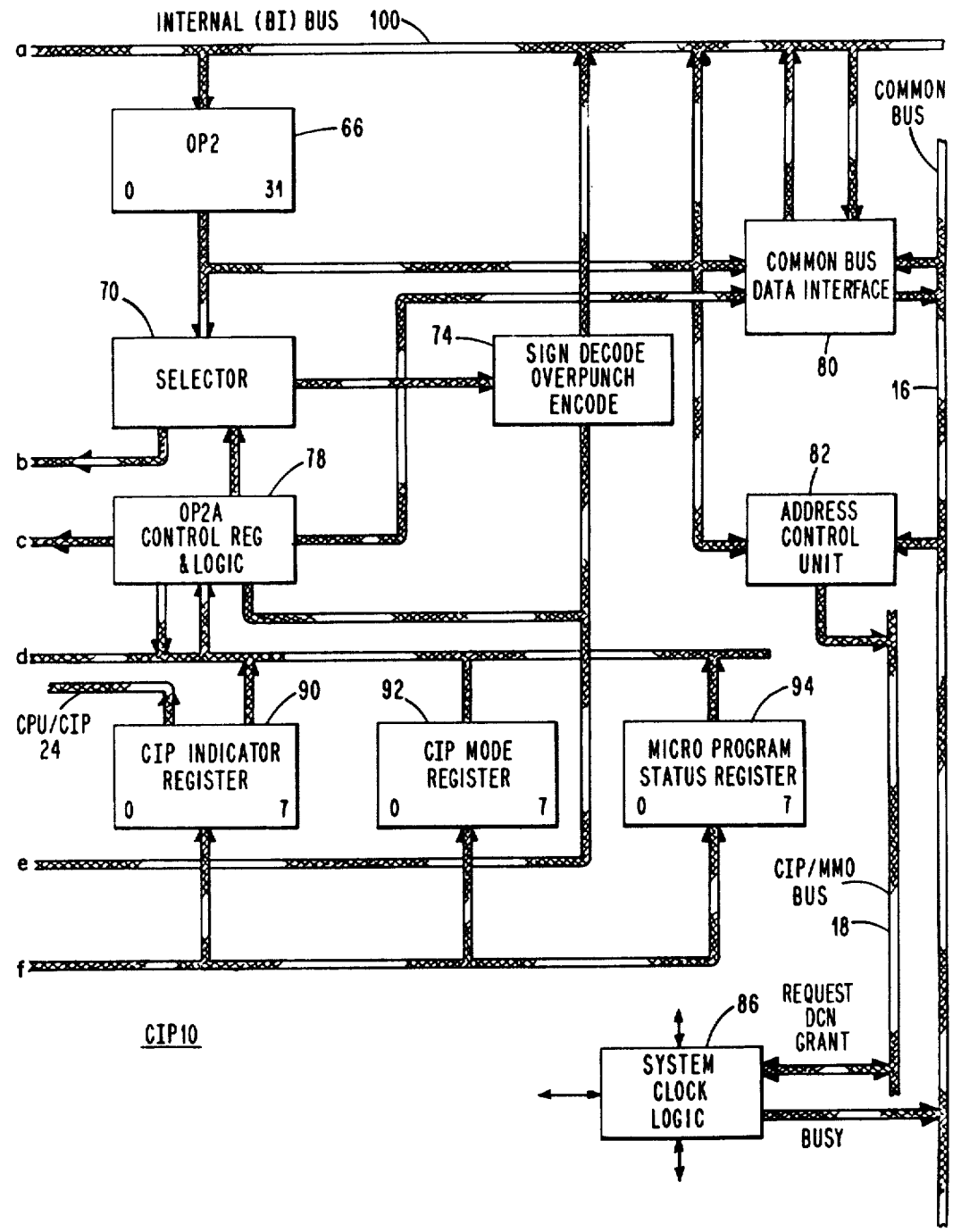
Fig. 2. (sheet 2 of 2)

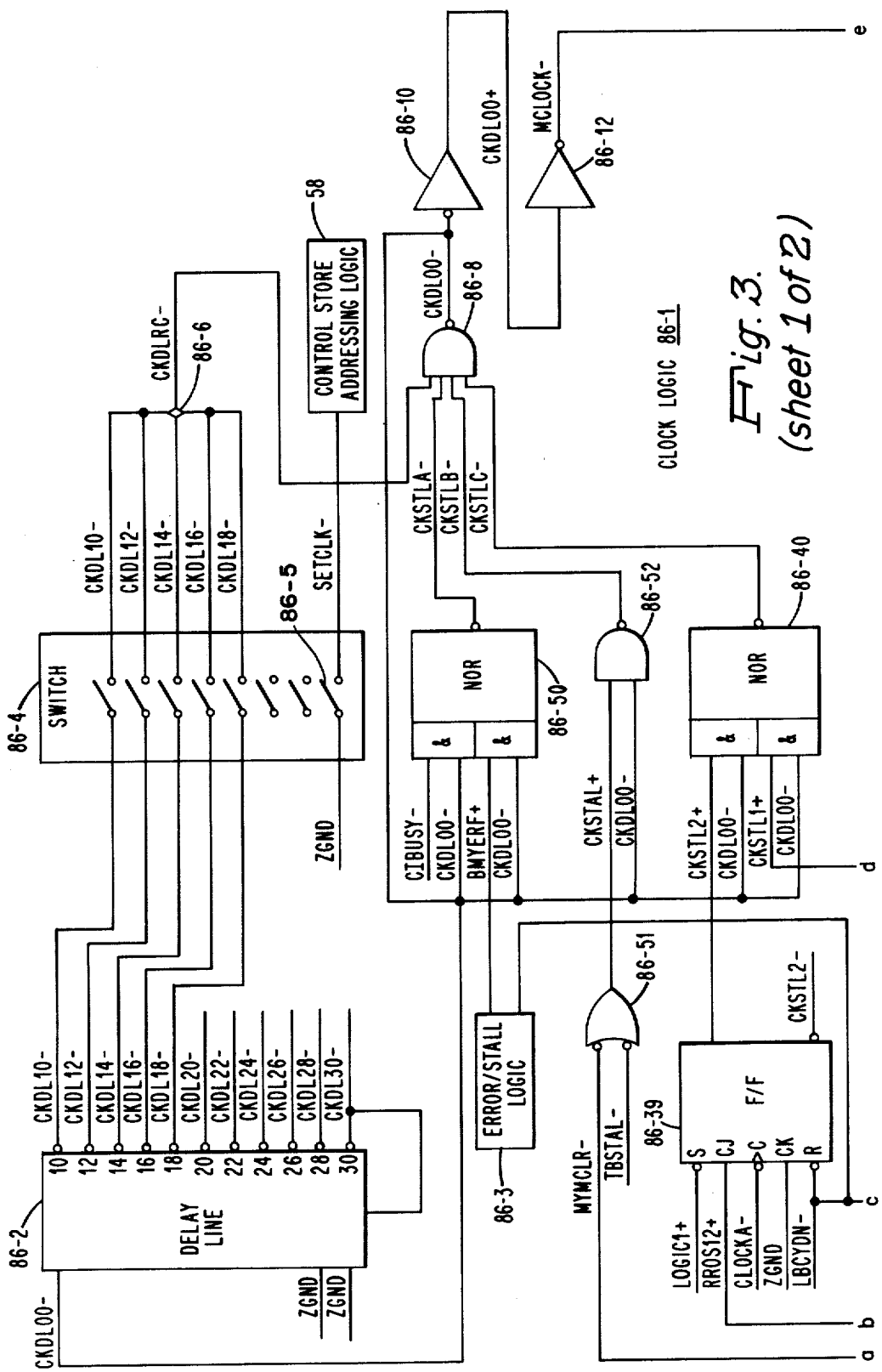
Fig. 3. (sheet 1 of 2)

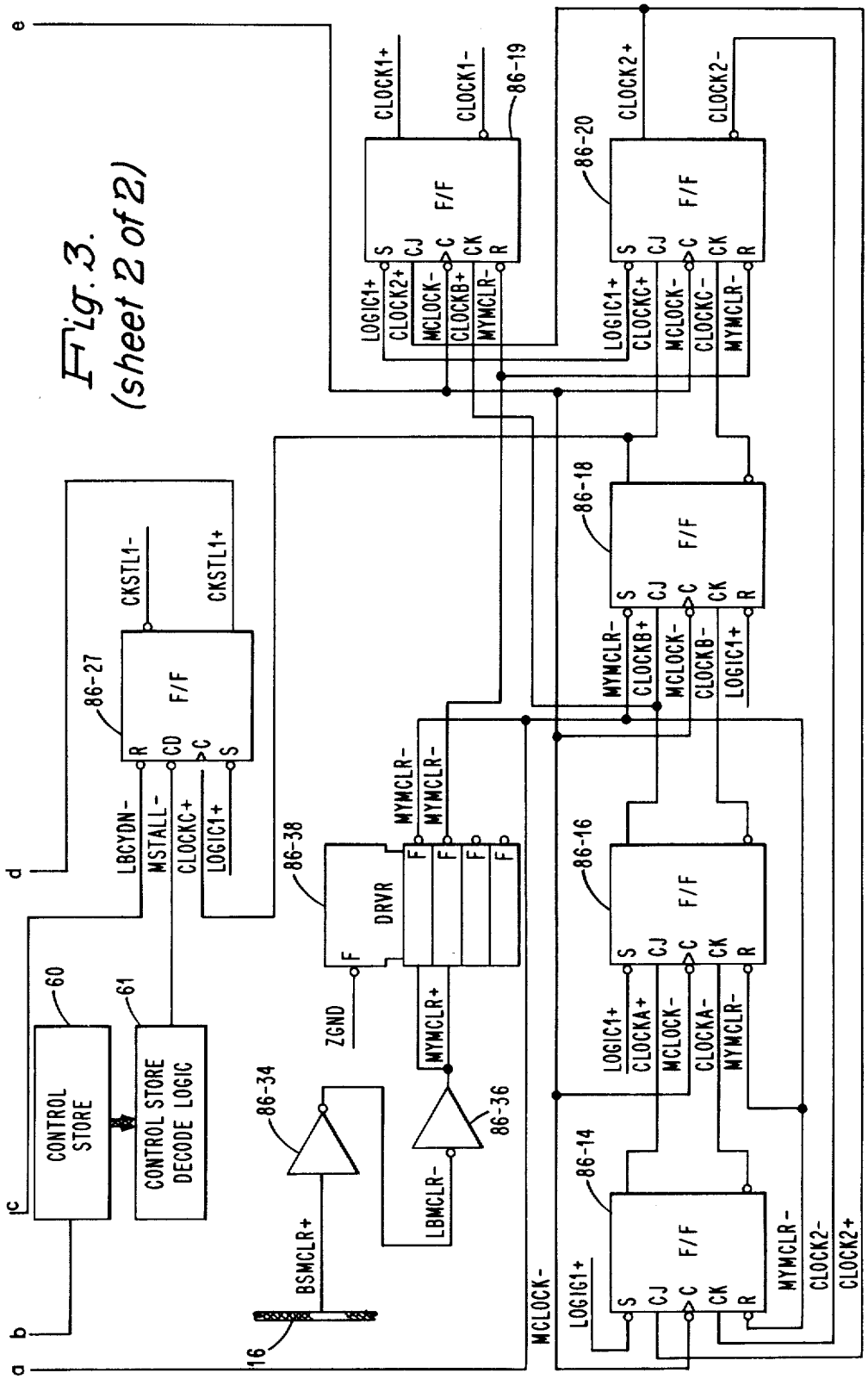

APPARATUS FOR SETTING THE BASIC CLOCK TIMING IN A DATA PROCESSING SYSTEM

RELATED APPLICATIONS

The following U.S. patent applications filed on an even date and assigned to the same assignee as the instant application are related to the instant application and are incorporated by reference.
1. "A Clock System Having a Stall Capability to Enable Processing Of Errors" by Steven A. Tague and Virendra S. Negi, filed on Apr. 3, 1981 and having U.S. Ser. No. 250,810.
2. "Diagnostic Testing of the Data Path in a Microprogrammed Data Processor" by Steven A. Tague and Virendra S. Negi, issued on Oct. 18, 1983 and having U.S. Pat. No. 4,410,984.

The following U.S. patent applications assigned to the same assignee as the instant application are related to the instant application and are incorporated by reference.
3. "A Data Processor Performing a Decimal Multiply Operation Using a Read Only Memory" by Steven A. Tague and Virendra S. Negi, issued on June 28, 1983 and having U.S. Pat. No. 4,390,961.
4. "A Data Processor Having Units Carry and Tens Carry Apparatus Supporting a Decimal Multiply Operation" by Virendra S. Negi and Steven A. Tague, filed on Dec. 24, 1980 and having U.S. Ser. No. 219,810.
5. "A Data Processor Having Carry Apparatus Supporting a Decimal Divide Operation" by Steven A. Tague and Virendra S. Negi, issued on May 17, 1983 and having U.S. Pat. No. 4,384,341.
6. "A Data Processor Using Read Only Memories for Optimizing Main Memory Access and Identifying the Starting Position of an Operand" by Steven A. Tague and Virendra S. Negi, filed on Dec. 24, 1980 and having U.S. Ser. No. 219,809.
7. "A Data Processor Having Apparatus for Controlling the Selection of Decimal Digits of an Operand When Executing Decimal Arithmetic Instructions" by Steven A. Tague and Virendra S. Negi, issued on May 17, 1983 and having U.S. Pat. No. 4,384,340.
8. "A Data Processor Using a Read Only Memory for Selecting a Part of a Register Into Which Data Is Written" by Steven A. Tague and Virendra S. Negi, filed on Dec. 24, 1980 and having U.S. Ser. No. 220,219.

BACKGROUND OF THE INVENTION

1. Field of the Invention

This invention relates generally to data processing systems and more particularly to apparatus including a switch which stabilizes the logic for enabling the setting of the clock timing.

2. Description of the Prior Art

As performance of data processing systems is improved by use of faster circuit components in the logic circuits, the clock cycle periods used in the CPU become shorter and accumulative tolerance that must be allowed due to component variations in the clock system circuit becomes a larger percentage of the total clock cycle period. For example, the variation may be plus or minus 5 nanoseconds in a 100 nanosecond clock cycle period for a data processing system designed for a minimum 95 nanosecond clock cycle period; this results in a plus or minus 5% variation in the clock cycle period. The same plus or minus 5 nanosecond variation in a 50 nanosecond clock cycle period results in a plus or minus 10% variation in the clock cycle period in a system designed for a minimum 45 nanosecond clock cycle period. If the clock can be adjusted during manufacturing to have a 45 nanosecond clock cycle period with a tolerance of −0 nanoseconds and +2 nanoseconds, the throughput of the worst case data processing system with an adjustable clock cycle period, one having a clock cycle period of 47 nanoseconds (45+2), can be up to 17.7% ((55−47)/45*100) better than a data processing system having a non-adjustable clock with the worst case clock cycle period of 55 nanoseconds (50+5).

Therefore, although it is desirable as mentioned hereinbefore not to have to individually adjust the clock cycle period of the system clock during manufacture, adjustment is necessary in order to maximize the throughput of the data processing system. An example of the clock system providing for the adjustment of the clock frequency is given in U.S. Pat. No. 3,775,696 entitled "Synchronous Digital System Having a Multi-Speed Logic Clock Oscillator" issued to Emory Carl Grath and incorporated herein by reference. In the clock system of U.S. Pat. No. 3,775,696, an adjustable delay line is connected in series with a fixed delay line with the output of the delay lines being fed as input to a NAND gate and the output of a NAND gate being fed as input to the delay lines as well as being used for the clock signal. In this device, the adjustable delay line is comprised of a plurality of selected lengths of copper transmission line which are etched onto any epoxy-glass circuit board onto which the remaining components are mounted, with each transmission line connecting a pair of plated terminals which extend through the printed circuit board. The propagation delay of copper etch on epoxy-glass circuit boards is approximately one nanosecond per six inches, such that each foot of transmission line introduces a two nanosecond time delay. The transmission line lengths are adaptable to be selectively interconnected by connecting the appropriate terminals, thereby introducing accumulative time delays. The lengths of the transmission line segment are binary weighted to allow introduction of a desired time delay with a minimum number of interconnections. The plurality of plated holes at the ends of the lengths of copper transmission line which comprise the adjustable delay line may be interconnected by short wire jumpers while only introducing negligible time delays.

Although the clock system of U.S. Pat. No. 3,775,696 is adjustable, it has several disadvantages. To provide for an adjustment of plus or minus 12 nanoseconds, a span of 24 nanoseconds, a minimum of 12 feet of copper etch transmission line is required and providing this may present significant problems in laying out the circuit board as more and more complex, circuits requiring more interconnects are used. In addition, the adjustment of the clock during manufacture by the placing of jumpers can be time consuming and therefore costly. Further the clock system can not be easily adjusted in the field during system maintenance to compensate for changes in clock speed due to components aging or replacement. Also the clock system can not be easily adjusted to operate the data processing system at marginal speeds to detect speed dependent problems before they impair the data processing system performance at normal operating speed.

U.S. application Ser. No. 224,727 entitled "Adjustable Clock System Having a Dynamically Selectable Clock Period" describes the use of a switch bank coupled to a multitapped delay line enabling the selective adjustment of the clock pulse width. To adjust the clock, a scope or counter is used while the clock is running. In the normal operation, the clock does not run continuously. This requires replacing the normal firmware with special firmware which is either time consuming and not easily done in the field.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

It is a primary object of the invention to provide an improved means for adjusting the clock cycle period of a clock cycle.

It is also an object of the invention to provide a means for adjusting the clock cycle by using a minimum number of firmware steps.

It is another object of the invention to provide a means for adjusting the clock cycle by using a minimum of manual interventions.

SUMMARY OF THE INVENTION

A microprogrammed commercial instruction processor (CIP) includes a control store for storing the firmware words of the microprogram and a system clock subsystem. The system clock subsystem includes a bank of switches coupled to a multitapped delay line for selecting delay line signals for setting the basic clock timing within specified tolerances.

When the master clear signal is generated, a system initialization firmware routine is read from the control store, a firmware word at a time to initialize the system. One of the firmware words tests the condition of a set clock switch from the bank of switches. If the set clock switch is closed, then the next firmware word read from the control store just loops on itself. This causes the basic clock signal to "free run" enabling the switches coupled to the multitapped delay line to be manipulated to adjust the basic clock timing.

BRIEF DESCRIPTION OF THE DRAWINGS

FIG. 2 is a block diagram of the commercial instruction processor 10.

FIG. 3 shows the detailed clock logic 86-1.

DESCRIPTION OF THE PREFERRED EMBODIMENT

Figure 1:
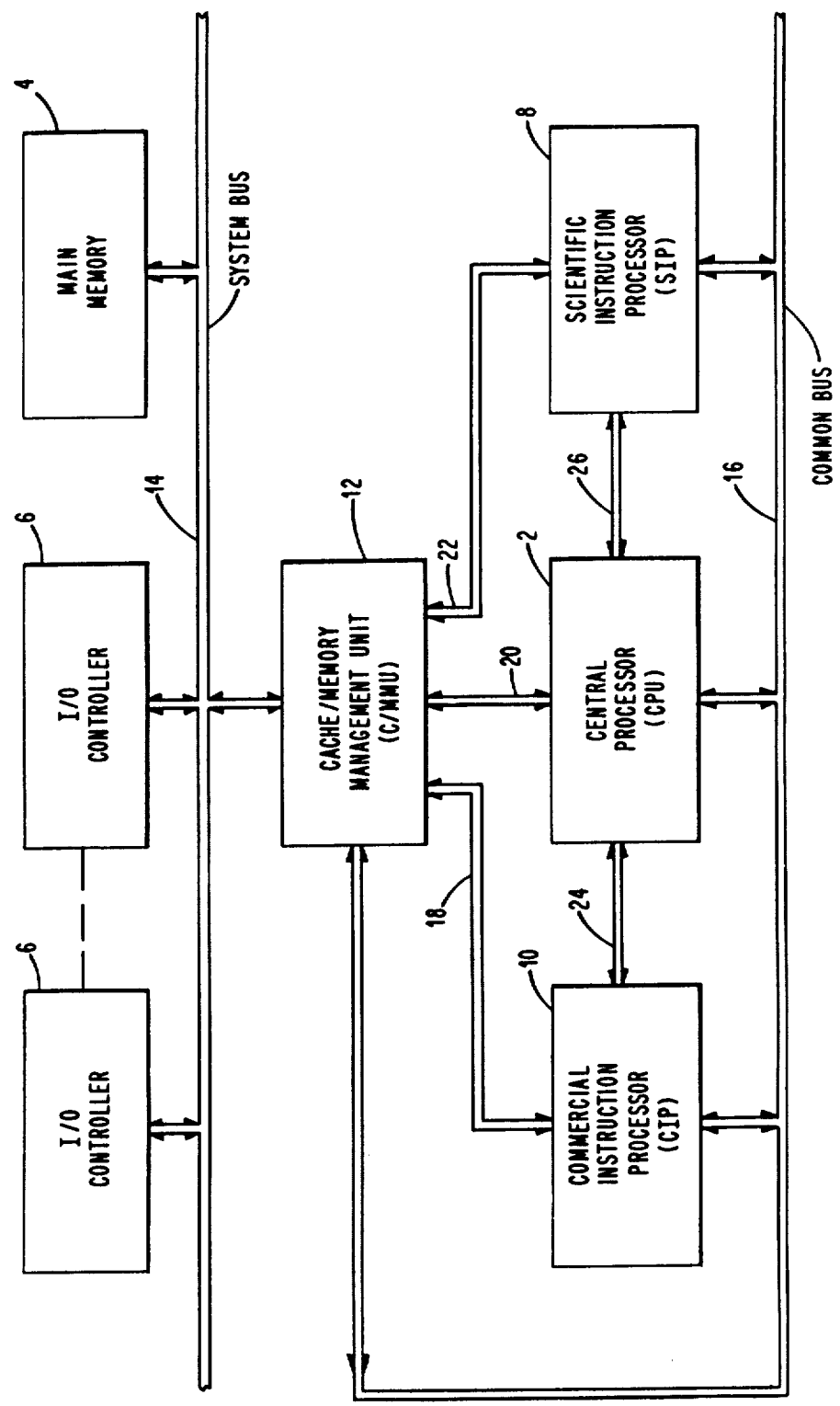
FIG. 1 is a block diagram of the overall data processing system.

FIG. 1 is an overall block diagram of a data processing system which includes a main memory 4, a plurality of input/output controllers 6 and a cache/memory management unit (C/MMU) 12; all coupled in common to a system bus 14. Coupled to the C/MMU 12 are a central processor unit (CPU) 2, a commercial instruction processor (CIP) 10 and a scientific instruction processor (SIP) 8 via buses 20, 18 and 22, respectively. The C/MMU 12, CIP 10, CPU 2 and SIP 8 are coupled in common to a common bus 16. Also, CPU 2 is coupled to the CIP 10 and the SIP 8 via buses 24 and 26 respectively.

The CIP 10 executes a set of instructions designed to facilitate the processing of character strips and decimal data. The SIP 8 executes a set of scientific instructions particularly useful for FORTRAN applications. This set includes arithmetic operations on single and double precision floating point operands and single and double word integer operands.

All instructions in a program under execution are received by CPU 2 from C/MMU 12 via buses 16 and 20. CPU 2 determines from the operation code of the instructions if the instruction is to be processed by the CPU 2, the CIP 10, or the SIP 8. The CPU 2 receives status information from the CIP 10 or SIP 8 over buses 24 and 26, respectively. If the CIP 10 or SIP 8 is available, the CPU 2 sends the necessary information out on common bus 16 and also bus 26 for the SIP 8. The CIP 10 or the SIP 8 processes the instruction and is operative with the C/MMU 12 via bus 18 or 22, respectively, and bus 16 for processing the instruction.

The CIP 10 processes instructions which include the following:
1. Decimal arithmetic operations on string and packed numeric data.
2. Alphanumeric and decimal move and compare instructions.
3. Conversion between binary and decimal numeric representation.
4. Edit instructions.
5. Arithmetic shift instructions.

Main memory 4 stores instructions and data and is operative with the C/MMU 12 for the transferring of instructions and data over system bus 14 under control of CPU 2 via bus 20. This operation is described in U.S. Pat. No. 4,030,075.

The C/MMU 12 which includes a cache memory stores the instructions and data currently being processed by the CPU 2, CIP 10 and SIP 8. The cache operation is described in U.S. Pat. No. 4,195,340.

The CPU 2 is also operative for initiating transfers of data between the I/O controllers 6 and main memory 4.

Referring to FIG. 2, all CIP 10 operations except initialization operations from a console are initiated by CPU 2 writing a 6 bit function code into a function code register 96 and a 32 bit double word of data into a portion of a common bus data interface 80 via common bus 16. The CIP 10 when activated transfers the low order 6 bits of the double word into an instruction register 56. If the function code register 96 stores an output task function code $07_{16}$, then the low order 16 bits of the double word are stored in a portion of an address control unit 82 to allow the CPU 2 to request the previous instruction word at a later time.

The contents of function code register 96 select a firmware word in a control store 60 via control store addressing logic 58. The firmwave word is loaded into a control store data register 62 and conditions CIP 10 to receive additional control information from CPU 2. A control store decode logic 61 generates control signals by decoding the output signals RD 00-67+ from control store data register 62. Signals RD 52-67+ applied to control store addressing logic 58 result in control store 60 branching to a specified address location.

The CIP 10 instructions operate on three data types; decimal strings containing binary coded decimal digits, alphanumeric strings containing ASCII characters and binary numbers having 16 or 32 bit precision. Decimal data operands are referenced by the location of the most significant digit and length and may have one or two digits in a byte. Packed decimal operands store two digits per byte and string decimal operands store one digit per byte.

String decimal operands may be unsigned and, assumed positive, may have a leading sign byte placed before the most significant decimal byte, a trailing sign byte placed after the least significant decimal byte or a trailing overpunched sign included with the least significant decimal byte.

Packed decimal operands may be unsigned implying a positive sign or have a trailing sign.

Binary data operands have the most significant binary bit as a sign bit with the binary point assumed to the right of the least significant binary bit using 2's complement notation.

The double words received by CIP 10 from CPU 2 following the instruction word specifying a decimal arithmetic operation indicates the decimal type, string or packed, sign information, the length of the operand and the effective address. This is the address of the byte containing the most significant character (4 or 8 bits/character).

Initially during the processing of a decimal numeric instruction, control store 60 generates signals via control store data register 62 causing the address control unit 82 to send the main memory 4 address of the operand 1 word containing the sign character to C/MMU 12. The operand 1 word containing the sign character is received by common bus data interface 80 and stored in OP1 64 and OP2 66. The sign character is selected by selector 70 for transfer to a sign decode overpunch encode logic 74 where it is decoded into status bits indicating an illegal sign or a negative sign. The control store addressing logic 58 is responsive to the illegal sign status bit and the negative sign status bit. If the sign is legal, then the negative sign status bit is stored in the microprogram status register 94. The operand 2 word containing the sign is processed in a similar manner and stored in OP2 66. Selector 70 transfers the sign character to sign decode overpunch encode logic 74 where it is decoded into the illegal sign or the negative sign and stored in the microprogram status register 94. This allows the CIP 10 to abort the instruction and notify the CPU 2 if an illegal sign was detected.

A decimal add instruction is indicated by an output task function code of $07_{16}$ and the instruction register 96 storing hexadecimal $2C_{16}$. During the execution of the decimal add instruction, operand 1 is added to operand 2 and the result of the addition is stored in the location in main memory 4 that stored operand 2.

The CIP 10 waits for the CPU 2 to send the additional control information required for the CIP 10 to execute the decimal add instruction. The additional control information consists of up to 3 double words describing operand 1 and up to 3 double words describing operand 2. The last double word received from the CPU 2 is an output last data descriptor indicated by a function code of $1F_{16}$.

The first of the 3 double words for each operand contains the effective virtual byte address of the operand which indicates the start of the operand in main memory 4, that is, the leftmost or lowest addressed byte containing some of the operand. The second double word may contain an indirect length. The third double word contains the data descriptor which specifies the data type and the position within the initial word received from main memory 4 of the start of the operand. The six double words are stored in the address control unit 82.

The output of instruction register 56 addresses a word in control store 60 to start the CIP 10 execution of the decimal add instruction by sending the main memory 4 address for the low order word of operand 1 containing the least significant decimal digits to the C/MMU 12 via bus 18. The first word of operand 1 is read from main memory 4 or from a cache memory (not shown) in C/MMU 12 and transferred to CIP 10 via common bus 16 and stored in OP1 64. Similarly, the low order word of operand 2 is received by CIP 10 and stored in data scratchpad unit 50 and in OP2 66.

The bit of each data descriptor word describing the characteristics of the two operands (ASCII string or packed) and the computed position of the least significant decimal digit in their respective low order words for operands 1 and 2 are stored in OP1A 84 and OP2A 78 respectively. In addition, the length of operands 1 and 2 is stored in descriptor operand length processing logic 88. The operation of operand length processing logic is described in application Ser. No. 219,809 entitled "A Data Processor Using Read Only Memories for Optimizing Main Memory Access and Identifying the Starting Position of an Operand". The OP1A 84 output is applied to a selector 68 and the OP2A 78 output is applied to a selector 70 for selecting the operand 1 and operand 2 decimal digits as they are transferred from OP1 64 and OP2 66 for processing by a decimal/binary ALU 76, one decimal digit at a time. The resulting decimal digit of the addition is transferred from ALU 76 to OP2 66 via an internal bus (BI) 100, replacing the operand 2 decimal digit that contributed to this result. The operation of OP1A 84 and OP2A 78 are described in U.S. Pat. No. 4,384,340 entitled "A Data Processor Having Apparatus for Controlling the Selection of Decimal Digits of an Operand When Executing Decimal Arithmetic Instructions" and application Ser. No. 220,219 entitled "A Data Processor Using a Read Only Memory for Selecting a Part of a Register Into Which Data Is Written".

OP1A 84 keeps track of the number of decimal digits remaining in OP1 64 from the transfer of the low order word. When the last decimal digit from the low order word is read from OP1 64 to ALU 76, OP1A 84 signals the branching logic in control store addressing logic 58 to address a word in control store 60 which fetches the next word of operand 1 from main memory 4 via C/MMU 12. The address of the next word of operand 1 is sent from address control unit 82 to C/MMU 12 via bus 18.

Similarly, OP2A 78 signals the branching logic in control store addressing logic 58 to enter into a firmware routine to transfer the resulting word of the addition stored in OP2 66 to common bus data interface 80 for transfer to main memory 4 via common bus 16 to C/MMU 12 at the location specified by the address from address control unit 82 over bus 18. A copy of the result is stored in data scratchpad unit 50. A read cycle is initiated to read the next word of operand 2 by sending the next address from address control unit 82 to C/MMU 12 via bus 18.

When the processing of all of the decimal digits from operand 1 or operand 2 is completed, descriptor operand length processing logic 88 controls the filling out of the field of the result in accordance with the remaining decimal digits of the longer operand.

Initially during the multiply instruction execution, the entire multiplicand, operand 2, is transferred from main memory 4 to the data scratchpad unit 50 via common bus data interface 80 and BI bus 100. A multiplier double word of operand 1 is transferred to OP1 64 via common bus data interface 80 and BI bus 100. The least significant multiplier digit is read into a multiply register/counter 52 from OP1 64 bia BI bus 100 and is applied to the input address terminals of a multiply programmable read only memory (PROM) 54. Each double word of the multiplicand in turn is transferred to OP1 64 from the data scratchpad 50. Each multiplicand digit in turn is applied to the remaining input address terminals of PROM 54 from OP1 64 via selector 68 to generate the partial product digits. Each partial product digit is applied to ALU 76 via selector 68 where it is added to a corresponding decimal digit stored in OP2 66 and the resultant partial product stored back in OP2 66.

The next multiplier digit is read into multiply register/counter 52 and the output applied to PROM 54. Again each multiplicand digit in turn is applied to PROM 54 and the partial product digits are applied to ALU 76 via selector 68 where they are added to the selected partial product digits stored in OP2 66. Here again, OP2A 78 controls selector 70 to select the partial product digit to be applied to ALU 76. The partial product result from ALU 76 is again stored in OP2 66 via BI bus 100.

When all of the multiplicand digits stored in data scratchpad unit 50 have been applied to the input address terminals of PROM 54 along with the most significant multiplier decimal digit output of multiply register/counter 52, the data scratchpad unit 50 contains the product of the multiplication. This product is written into main memory 4 via OP2 66, common bus data interface 80 and common bus 16.

A decimal division instruction is executed by receiving the dividend and divisor in common bus data interface 80 from C/MMU 12 via common bus 16 for storage in the data scratchpad unit 50. Portions of the divisor are stored in OP1 64 in turn and portions of the dividend/partial remainder are stored in OP2 66 in turn. The CIP 10 executes the decimal divide instruction by a series of successive subtractions and counting the number of successful subtractions in an ALQR register/counter 72. A successful subtraction is one in which the result is a positive number.

A CIP indicator register 90 is set by the control signals to indicate the status of CIP 10. Register 90 includes an overflow indicator which is set during decimal operations when the receiving field cannot store all significant digits of the result or a divide by zero is detected. A truncation indicator is set during alphanumeric operations when the receiving field cannot contain all characters of the result. A sign fault indicator is set during decimal operations when a negative result is stored in an unsigned field. A greater-than indicator is set during the execution of certain decimal and alphanumeric instructions when the result is greater than zero for decimal numeric operations or operand 1 is greater than operand 2 for decimal or arithmetic comparisons. A less-than indicator is set during the execution of certain decimal and alphanumeric instructions when the result is less than zero for decimal arithmetic instructions or operand 1 is less than operand 2 for either decimal or alphanumeric comparisons.

A CIP mode register 92 stores an overflow trap mask and a truncation trap mask which are indications of which special action the CIP 10 and CPU 2 should take when the overflow or truncation condition arises.

A system clock logic 86 includes a 160 nanosecond four phase clock that provides clock signals to trigger all CIP 10 registers and all test and control flops, stabilize registers after loading, signify that address, data, control and parity are valid allowing initiation of a local bus cycle. In addition, the system clock logic 86 may be stalled when additional time is required to complete certain CIP 10 functions. The system clock logic 86 generates a BUSY signal over common bus 16 to indicate to CPU 2 that the CIP 10 is not available, receives a DCNCNI+ signal from the C/MMU 12 bus to signal the CIP 10 that data for the CIP 10 is on the common bus 8, generates a REQUEST for use of the common bus 16, and waits for a GRANT from the C/MMU 12.

The microprocessor status register 94 in addition to storing operand sign information also stores an indication if an overflow was detected in executing a decimal numeric instruction, whether an encode or a decode overpunched sign operation is required, and when a decimal add operation is completed.

FIG. 3 shows a portion of the detailed system clock logic 86. A basic clock signal MCLOCK— timing is generated by selecting one or two adjacent output signals CKDL10—, CKDL12—, CKDL14—, CKDL16— or CKDL18— from a delay line 86-2. The signals are selected by a switch 86-4 and applied to a junction 86-6. An output signal CKDLRC— at logical ONE is applied to an input of a NAND gate 86-8 which generates output signal CKDL00— at logical ZERO. This forces the selected output signal of delay line 86-2 to logical ZERO, forcing the output signal CKDLRC— of junction 86-6 to logical ZERO. This forces signal CKDL00— to logical ONE. Signal CKDL00— cycles between logical ONE and logical ZERO thereby generating a free running square wave at a frequency selected by switch 86-4. Note that any one of the stall signals CKSTLA—, CKSTLB— or CKSTLC— at logical ZERO applied to NAND gate 86-8 will stall the basic clock by keeping signal CKDL00— at logical ONE.

Signal CKDL00— generates clock signal MCLOCK— through inverters 86-10 and 86-12. The switch positions of switch 86-4 are selected to generate the timing of clock signal MCLOCK— as a 40 nanosecond nominal square wave timing cycle, 20 nanoseconds at logical ONE and 20 nanoseconds at logical ZERO.

Clock signal MCLOCK— is applied to the clock terminals of flops 86-14, 86-16, 86-18, 86-19 and 86-20. The timing sequence is started during the master clear operation when the BSMCLR+ signal is received over common bus 16. Flop 86-18 is set and flops 86-20, 86-14 and 86-16 are reset by forcing the clear signal MYMCLR— to logical ZERO via inverters 86-34 and 86-36 and a driver 86-36. The master clear operation also forces signals CKDL00— and CKDLRC— to logical ONE since signal CKSTLB— is forced to logical ZERO via a NOR gate 86-51 and a NAND gate 85-52. Flop 86-18 setting forces output signal CLOCKC+ to logical ONE and output signal CLOCKC— to logical ZERO. At the conclusion of the master clear operation, clear signal MYMCLR— is forced to logical ONE. The return of the MYMCLR— signal to logical ONE causes signal MCLOCK— to fall via gates 86-51, 86-52, 86-8, 86-10 and 86-12. This falling MCLOCK— signal causes flop 86-20 to set and flop 86-18 to reset. Successive falls of clock signal MCLOCK— result in the sequence of successive setting and resetting of flops 86-14, 86-16, 86-18, 86-19, 86-20, etc. During non-stall operation, the sequential clock signals CLOCKA+, CLOCKB+, CLOCKC+ and CLOCK2+ are at logical ONE for 40 nanoseconds and at logical ZERO for 120 nanoseconds and provide the basic logic timing for the CIP 10 operation. The transition from signal CLOCK2+ to signal CLOCKA+ identifies the beginning of a control cycle which is the time at which the control store data register 62 is loaded.

The CIP 10 clock is stalled during the following operations:

1. During a system clear operation, signal BSMCLR+ is received via local bus 16. This results in the stall clock signal CKSTLB— from a NOR gate 86-51 being forced to logical ZERO via an inverter 86-34, signal LBMCLR—; an inverter 86-36, signal MYMCLR+; a driver 86-38, signal MYMCLR—; and NOR gate 86-51.

2. During a maintenance operation, when signal TBSTAL— at logical ZERO is applied to NOR gate 86-51 forcing stall clock signal CKSTLB— to logical ZERO as above.

3. During an information transfer between main memory 4 and CIP 10, a clock stall flop 86-27 sets on the rise of the CLOCKC+ signal when firmware signal MSTALL— from the control store decode logic 61 is at logical ZERO. A clock stall signal CKSTL1+ at logical ONE is applied to an AND/NOR gate 86-40, forcing clock stall signal CKSTLC— to logical ZERO. This prevents firmware from attempting to transfer information before it is received by the CIP 10. This stall is also used to keep the firmware from changing the main memory 4 address before the main memory 4 or cache is through using it.

4. During a firmware cycle, control store 60 signal RROS12+ at logical ONE (a common bus request firmware signal) causes flop 86-39 to set on the fall of clock signal CLOCKA—. Output signal CKSTL2+ at logical ONE applied to AND/NOR gate 86-40 forces clock stall signal CKSTLC— to logical ZERO. Flops 86-27 and 86-39 are reset on the fall of signal LBCYDN— from error/stall logic 86-3 to end the stall operation.

5. During the time required for the hardware to change the address of the next control cycle, the error signal BMYERF+ at logical ONE from error/stall logic 86-3 applied to an AND/NOR gate 86-50, forces clock stall signal CKSTLA— to logical ZERO.

6. During a control cycle when the CIP 10 is not busy, signal CIBUSY— is forced to logical ONE at the beginning of the control cycle. Signal CIBUSY— is applied to the AND/NOR gate 86-50 to force the clock stall signal CKSTLA— to logical ZERO.

The output signal SETCLK— of switch 86-4 which is applied to the control store addressing logic 58, FIG. 2, is used while adjusting the basic timing of CIP 10.

Selected switches of switch bank 86-4 are closed to adjust the MCLOCK— output signal of inverter 86-12 to a 40 nanosecond period (of a nominal 50% duty cycle). The required tolerance is —0+4 nanoseconds. This is accomplished by locking the system in a repeating firmware step by manually closing a switch 86-5 which forces signal SETCLK— to logical ZERO. Signal SETCLK— is applied to control store addressing logic 58 and sampled during a starting CIP 10 firmware routine immediately following the overall system initialization operation. The bit configurations of a firmware word stored in control store 60 is modified by bits received by control store addressing logic 58 indicating that signal SETCLK— is at logical ZERO and branches unconditionally to address a "set clock" firmware word stored in control store 60. The CIP 10 loops on the set clock firmware word.

Figure 4:
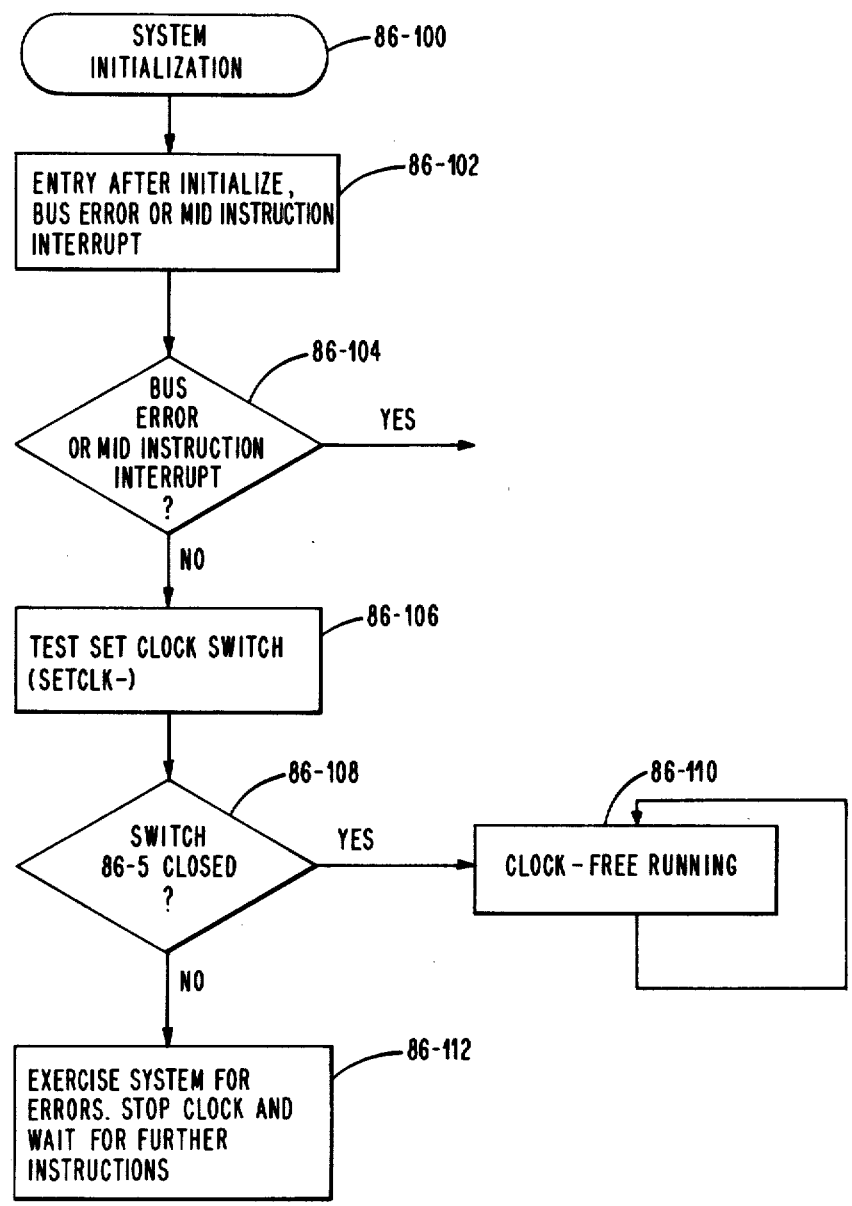
FIG. 4 shows the initialization firmware sequence.

FIG. 4 shows the firmware step affected by the manipulation of switch 86-5 of switch bank 86-4. During normal operation, the switch 86-5 is opened. The system initialization firmware sequence is entered into block 86-100 by an operator depressing an initialize button on a console. Block 86-102 initiates a test for a system bus error or a mid-instruction interrupt indication. The test is accomplished in decision block 86-104. If no errors are sensed, then block 86-106 initiates a test of the position of switch 86-5. Decision block 86-108 branches to block 86-112 if the switch 86-5 is open, where the system is exercised and tested for error conditions. At the completion of the testing, the clock is stalled by method 6 supra.

Decision block 86-108 branches to block 86-110 if switch 86-5 is closed. The firmware loops on block 86-110 which keeps the CIP 10 in a non-stall mode. This enables the clock timing to be adjusted by manipulating the switches of switch bank 86-4. Normally one switch or possibly two adjacent switches closed will select the required delay signals from delay line 86-2.

When the clock timing is within specifications, the system is reset, switch 86-5 is opened and the initialization button depressed to force the control store addressing out of the "set clock" control cycle and into normal operation.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A microprogram controlled data processing system comprises:
    clocking means for generating cyclic timing signals having predetermined frequencies, said clocking means including switching means for generating a set clock signal and a plurality of clock delay signals; and
    control store means including
        read only memory means for storing a plurality of microprogram words in a plurality of memory locations;
        addressing means for addressing said plurality of memory locations; and
        register means for storing a microprogram word read from a memory location specified by said addressing means,
            wherein said addressing means is responsive to said set clock signal and a first microprogram word read from a first memory location specified by said addressing means during a first cycle of operation and stored in said register means for repeatedly addressing a second memory location for repeatedly transferring a second microprogram word to said register means during all subsequent cycles of operation; said clocking means further including non-stall means coupled to said register means and responsive to said second microprogram word for generating a plurality of non-stall signals; and gating means responsive to said plurality of non-stall signals and selected ones of said plurality of clock delay signals for generating said cyclic timing signals having said predetermined frequencies.

2. The system of claim 1 wherein said switching means comprises:

multitapped delay line means responsive to a second clock delay signal for generating said plurality of clock delay signals, each delayed from said first cyclic timing signal by a different predetermined amount of time;

switch selection means coupled to said multitapped delay line means for selecting certain ones of said plurality of clock delay signals.

3. The system of claim 2 wherein said gating means comprises:

OR'ing means coupled to said switch selection means and responsive to said certain ones of said plurality of clock delay signals for generating a first clock delay signal; and NAND'ing means responsive to said first clock delay signal and said plurality of non-stall signals for generating said second clock delay signal.

4. The system of claim 3 wherein said gating means further comprises:

flip-flop means responsive to a sequence of said second clock delay signals for generating said cyclic timing signals having said predetermined frequencies.

* * * * *